United States Patent [19]
Breitbach et al.

[11] Patent Number: 6,076,776
[45] Date of Patent: Jun. 20, 2000

[54] PROFILE EDGE OF AN AERODYNAMIC PROFILE

[75] Inventors: Elmar J. Breitbach; Thilo Bein, both of Braunschweig, Germany

[73] Assignee: Deutsches Zentrum fur Luft-und Raumfahrt e.V., Bonn, Germany

[21] Appl. No.: 09/048,831

[22] Filed: Mar. 23, 1998

[30] Foreign Application Priority Data

Mar. 21, 1997 [DE] Germany .......................... 197 12 034

[51] Int. Cl.$^7$ ...................................................... B64C 3/52
[52] U.S. Cl. ........................ 244/219; 244/75 R; 244/214
[58] Field of Search ............................... 244/35 R, 75 R, 244/90 R, 219, 215, 214, 134 R, 134 D; 416/23, 24

[56] References Cited

U.S. PATENT DOCUMENTS

| | | | |
|---|---|---|---|
| 3,743,219 | 7/1973 | Gorges | 244/210 |
| 4,545,553 | 10/1985 | Finke et al. | 244/134 D |
| 4,732,351 | 3/1988 | Bird | 244/134 D |
| 4,922,096 | 5/1990 | Brennan . | |
| 5,034,649 | 7/1991 | Chida et al. | 310/332 |
| 5,191,791 | 3/1993 | Gerardi et al. | 73/178 R |
| 5,206,806 | 4/1993 | Gerardi et al. | 244/134 F |
| 5,224,826 | 7/1993 | Hall et al. | 416/4 |
| 5,366,176 | 11/1994 | Loewy et al. | 244/75 R |
| 5,374,011 | 12/1994 | Lazarus et al. | 244/75 R |
| 5,440,193 | 8/1995 | Barrett | 340/328 |
| 5,485,053 | 1/1996 | Baz | 310/326 |
| 5,558,298 | 9/1996 | Pla et al. | 244/1 N |
| 5,730,581 | 3/1998 | Buter et al. | 416/23 |

FOREIGN PATENT DOCUMENTS 40 33 091 C1   10/1990   Germany .

OTHER PUBLICATIONS

Dr. Thomas Kretschmer, Multifunktionale Werkstoffe, Soldat Und Technik, Feb. 1997, p. 102.
Erhard Heckmann, "Forderung der zivilen Luftfahrtforschung," WT Jan. 1997, pp. 26and 27.
Johannes Gillar, "Die Schwingungen sind gleich Null," Industrieanzeiger 48–49/95, pp. 38–40.
Johannes Gillar, "Multifunktionale Systeme mit breiten Anwendungsgebieten," Industrieanzeiger 25/95, pp. 26–29.

Primary Examiner—Galen L. Barefoot
Attorney, Agent, or Firm—Salter & Michaelson

[57] ABSTRACT

In the case of a profile edge of an aerodynamic profile the profile edge (1, 20) comprises multifunctional material on its outside (3, 23) and/or inside (2, 22) or within its structure (11).

33 Claims, 2 Drawing Sheets

PROFILE EDGE OF AN AERODYNAMIC PROFILE

BACKGROUND AND SUMMARY OF THE INVENTION

The invention relates to a profile edge of an aerodynamic profile.

Aerodynamic profiles are, for example, helicopter rotor blades. In forward flight the helicopter rotor blades experience fundamentally non-stationary flow conditions. In high-speed flight these may be very complex. Pronounced shock waves arise on the advancing rotor blade in this case. On the retreating rotor blade, on the other hand, non-stationary vortex separations occur in the course of high uplift. The latter phenomenon is described by the term "dynamic stall".

In the case of a helicopter rotor blade the angle of attack of the profile, for example, changes dynamically with the frequency of rotation of the rotor. This means that a different angle of attack applies for each azimuth angle of the rotor blade with respect to the longitudinal axis of the helicopter. In general, in the course of dynamic increase of the angle of attack, aerodynamic coefficients arise which are different from those within the range of dynamic reduction of the angle of attack. This results in aerodynamic hysteresis. By reason of the accelerated profile movement of the helicopter rotor-blade profile, in comparison with the static case a gain in uplift arises which can be utilized to good effect. Within the range of high angles of attack, however, the uplift collapses very considerably and rapidly, as a result of which a considerable rise in drag and in moment about the axis of rotation is generated. The moment is nose-heavy and loads the rotor blade in pulsed manner. It can stimulate the latter to oscillate.

With the aid of the so-called "droop nose" it is known to reduce the increase in drag and also the moment that has a considerably nose-heavy effect. The "droop nose" is a leading edge of the rotor blades that is variable in shape. The objective of this variable leading edge is a selective, cyclic decrease or increase in the curvature—operating with the rotation of the rotor—of the profile of the rotor blade with a view to improving the aerodynamic characteristics of the latter. Above all, the effects of the non-stationary separation of flow (dynamic stall) can be influenced positively with the "droop nose".

The collapse of the uplift and the associated effect of, for example, drag rise (rise in drag as a consequence of transonic flow in the region of the blade tip—advancing blade, psi$\equiv\downarrow\epsilon°$), fluttering, etc may be shifted to higher angles of attack by this means.

Actuators are known in the aircraft domain for adjusting parts of the aerofoils. Such actuators are, for example, electric motors, pneumatic drives or, as in U.S. Pat. No. 4,296,900, hydraulic drives, or, as in U.S. Pat. No. 4,922,096, piezoelectric actuators which are arranged under the outer skin and which change the contour thereof by local application. These local measures are still not optimal and in some applications also cannot be achieved.

DE 40 33 091 C1 proposes the attainment, through the use of electrostrictive structures comprehensively, of an optimisable elasticity behavior of wing contours, use being made of matrices consisting of ceramic material. A change of wing shapes is not provided for.

The object underlying the invention is to create a transformation, in terms of structural mechanics, of the effects of the "droop nose" in the case of a profile edge of an aerodynamic profile.

This object is achieved by means of a profile edge with an aerodynamic profile wherein the profile edge comprises multifunctional material on its outside and/or inside or within its structure, wherein a coating or a shear-active layer of multifunctional material integrated within the structure of the aerodynamic profile is provided in partly distributed manner on the profile edge, and wherein flexural moments and/or longitudinal or thrust forces which generate a deformation of the structure can be introduced into the structure forming the profile edge by means of the layers of multifunctional material as active layers.

Further developments of the invention are defined in the subclaims. As a result, a deformation of the profile edge of the aerodynamic profile can be generated that conforms to the aeroelastic requirements. Conventional actuators—for example, electric motors or pneumatic or hydraulic drives—are, by virtue of their dimensions, too large and too heavy to be capable of being integrated within a profile edge, of a helicopter rotor blade for example. On the other hand, the provision according to the invention of multifunctional materials proves to be advantageous not only by virtue of their dimensions and their weight but also by reason of their suitability for highly dynamic applications. The performance data of the conventional known actuators, such as electric motors, pneumatic drives or hydraulic drives, often prove to be too low and therefore unsuitable for use with a view to transformation, in terms of structural dynamics, of the so-called "droop nose" on rotor blades; piezoelectric actuators acting locally are unable to bring about the global deformations of the entire rotor blade under consideration that can be achieved in accordance with the invention.

In principle a profile edge of an aerodynamic profile is created wherein the profile edge comprises multifunctional material on its outside and/or inside or within its structure. A coating of multifunctional material is preferably provided in partly distributed manner on the profile edge. In this connection the profile edge is advantageously a leading edge of a rotor blade, for example. However, the multifunctional material may alternatively also be a shear-active layer integrated within the structure of the aerodynamic profile. By means of the multifunctional material, flexural moments and/or longitudinal or thrust forces can be introduced into the structure forming the profile edge. A deformation of the structure can be generated by this means. Drive of the multifunctional material can be effected selectively and variably over the periphery of the aerodynamic profile. This drive may be effected either in phase or in antiphase. Sensors consisting of multifunctional material and adaptive regulators are preferably also provided. By this means the actual deformation of the profile edge can be detected by the sensors and compared in the adaptive regulator with predetermined desired values. A deviation of the actual value from the desired value can be regulated by the adaptive regulator through appropriate response of the multifunctional material by way of actuator. In particularly preferred manner the multifunctional material that is provided by way of actuator serves at the same time as sensor for the profile-edge deformation.

In particularly preferred manner the profile edge is constructed with a wall thickness that is variable over the periphery. This stiffness which is variable over the periphery of the structure of the aerodynamic profile then permits an additional passive influence to be exerted on the profile-edge deformation which arises.

By way of multifunctional material use is preferably made of a material that is suitable for high-frequency applications. In particularly preferred manner use is made for this purpose of a piezoceramic, an electrostrictive material or a magnetostrictive material. The profile edge preferably consists of fibre composite material, in particular of composite material reinforced with carbon fibre (CFC) or composite material reinforced with graphite fibre (GFC). But it may also consist of metal. The active layers consisting of multifunctional material are preferably laminated or bonded onto the profile edge or applied by means of plasma processes. But they may also be applied by alternative processes or, preferably, incorporated into the outermost layers by lamination. In the latter case a thin layer of glass fibre can be applied by way of protective layer, having a layer thickness of 10 μm for example, over the layer incorporated by lamination. If the multifunctional material is provided in the form of a shear-active layer it is preferably embedded into the structure of the profile edge of the aerodynamic profile or incorporated by lamination.

The profile edge may be either a leading edge or a trailing edge. For example, it is part of a helicopter rotor blade, part of a vane of a wind-power installation, part of a turbine blade or compressor blade or part of an aerofoil of an aircraft.

If the profile edge is provided by way of elastic trailing edge of an aerodynamic profile, a trailing edge tapering to a point is preferably provided. Hence a variable curvature of aerodynamic profiles can preferably be generated.

BRIEF DESCRIPTION OF THE DRAWING

With a view to more detailed explanation of the invention, embodiments of a profile edge according to the invention are described below with reference to the drawings. The latter show in.

DETAILED DESCRIPTION OF THE ILLUSTRATIVE EMBODIMENTS

Figure 1:
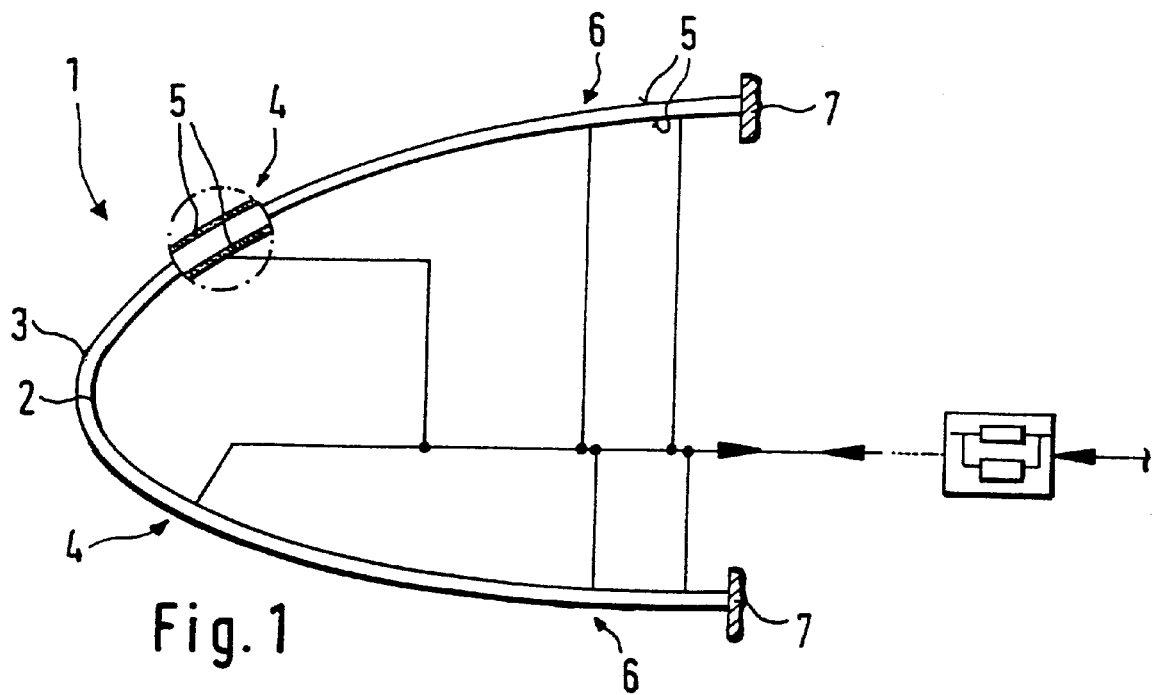
FIG. 1 a schematic diagram of a profile edge according to the invention in the form of a leading edge, FIG. 2 a schematic diagram of the leading edge according to FIG. 1 in the driven state, FIG. 3 a schematic diagram of a second embodiment of a profile edge according to the invention in the form of a leading edge, and FIG. 4 a schematic diagram of a side view of a third embodiment of a profile edge according to the invention in the form of an elastic trailing edge.

In FIG. 1 a schematic diagram of a side view of an aerodynamic profile is represented. The aerodynamic profile comprises a leading edge 1. The leading edge 1 of the substantially parabolic profile is the region of maximum curvature. Above and below this maximum curvature, regions 4 with layers 5 of multifunctional material are provided on the inside 2 and on the outside 3 of the profile edge. In these regions the multifunctional material is applied, accordingly in partly distributed manner, as a coating on the inside 2 and on the outside 3 of the leading edge 1.

The layer of multifunctional material 5 serves by way of active layer. This means that flexural moments and/or longitudinal or thrust forces can be introduced into the structure of the leading edge 1 by driving the active layers on the inside 2 and on the outside 3 of the leading edge 1 of the profile. As a result of such driving of the active layers 5 the leading edge 1 of the profile is deformed.

In order to enable uniform deformation of the leading edge, layers 5 of multifunctional materials are also applied in the region 6 of the support points 7, namely in the region of the fixed points of the profile, on the inside 2 and on the outside 3 of the leading edge 1. The regions 6 are particularly preferred regions for application of the multifunctional material.

Particularly suitable by way of multifunctional material are a piezoceramic or electrostrictive and magnetostrictive materials. In any case, use should be made of a material that is suitable for high-frequency applications. The leading edge 1 preferably consists of fibre composite material or metal. The layers 5 of multifunctional material on the inside 2 and on the outside 3 of the leading edge 1 are preferably laminated on, bonded, incorporated into the outer layers by lamination, or applied by means of plasma processes.

The drive by means of piezoceramic, which is a ceramic produced from piezoelectric material and which with regard to its properties is largely isotropic as a consequence of its polycrystalline structure, is based on the phenomenon that as a result of deformations such as by compressive or tensile stress some crystals can be polarised. Surface charges of differing sign then arise on opposite surfaces. The electrostatic charge that arises upon compression of crystals in the direction of the polar axes is proportional to the magnitude of the force acting and is an expression of a polarisation of the crystal under the influence of pressure (or the influence of tension), namely of the shifting of positive ions as opposed to negative ions relative to one another along the polar axis. As a result, the charges of crystal faces located opposite one another have opposite signs. On the other hand, with such piezoelectrically excitable crystals it is also possible, conversely, to bring about compression and dilation, accordingly also a change in length, by application of an electric field, depending on the polarity or direction thereof. This is described as the inverse piezoelectric effect. As a result of the application of the electric field and the change in length of the layers 5 of multifunctional material following therefrom, the leading edge 1 is deformed.

Figure 2:
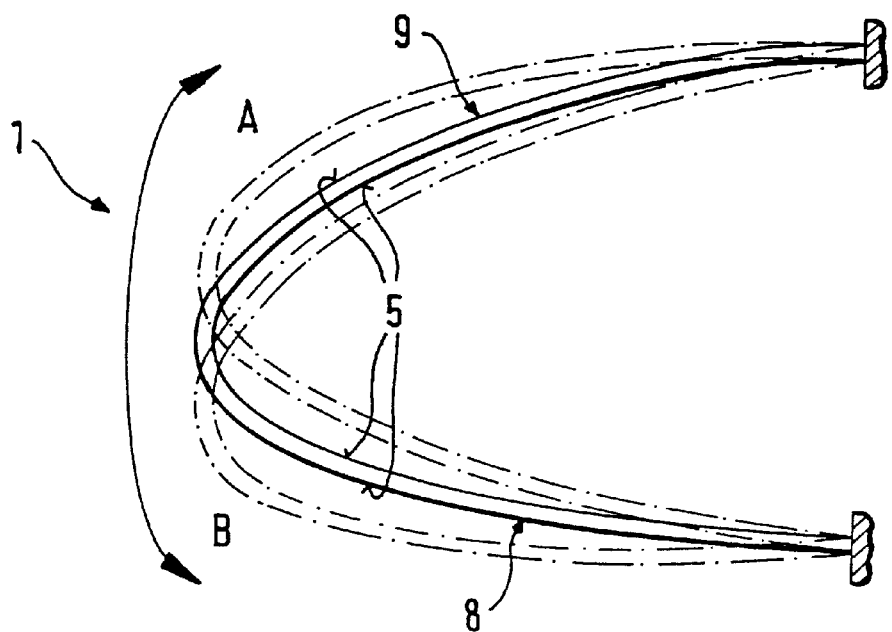

Such deformations of the structure of the leading edge 1 of the profile are characterised in FIG. 2 by the reference symbols A and B. In order to arrive at position A from the initial position according to FIG. 1, which is represented in FIG. 2 as the central position, the layers 5 of multifunctional material located on the underside 8 of the leading edge 1 are lengthened. As a result, the leading edge 1 is deformed in such a way that it moves upwards into position A.

If, conversely, the layers 5 of multifunctional material arranged on the upper side 9 are lengthened, the leading edge 1 of the profile assumes position B. The two directions of motion out of the initial position are indicated by the double-headed arrow in FIG. 2.

The layers 5 of multifunctional material arranged on the upper side 9 and on the lower side 8 of the leading edge 1 accordingly serve as actuators. In preferred manner not only the actuators located on the underside or on the upper side are addressed but, simultaneously, both those located on the upper side and those located on the underside. The drive can then be effected either in phase or in antiphase. Where only small angles of attack, namely deformations of the leading edge 1 in relation to the initial position, are to be generated, use is advantageously made of a co-phasal drive. With a view to generating larger angles of attack, an antiphase drive is advantageously carried out.

Since not only a drive in the form of a selective control of the actuators takes place but an adaptive regulation of these deformations is also to be provided, namely a selective generation of appropriate angles of attack of the profile, in the adaptive regulator there is provision for feedback of the actual values. With a view to detecting the actual values, sensors are arranged on the leading edge 1. The actuators are preferably used simultaneously as sensors. By this means the outlay in terms of material is kept as low as possible.

In particularly preferred manner the leading edge is constructed with a wall thickness that is variable over its periphery. The stiffness of the structure of the profile is influenced by this means. The result of this is a passive influence on the deformation of the leading edge of the profile.

Figure 3:
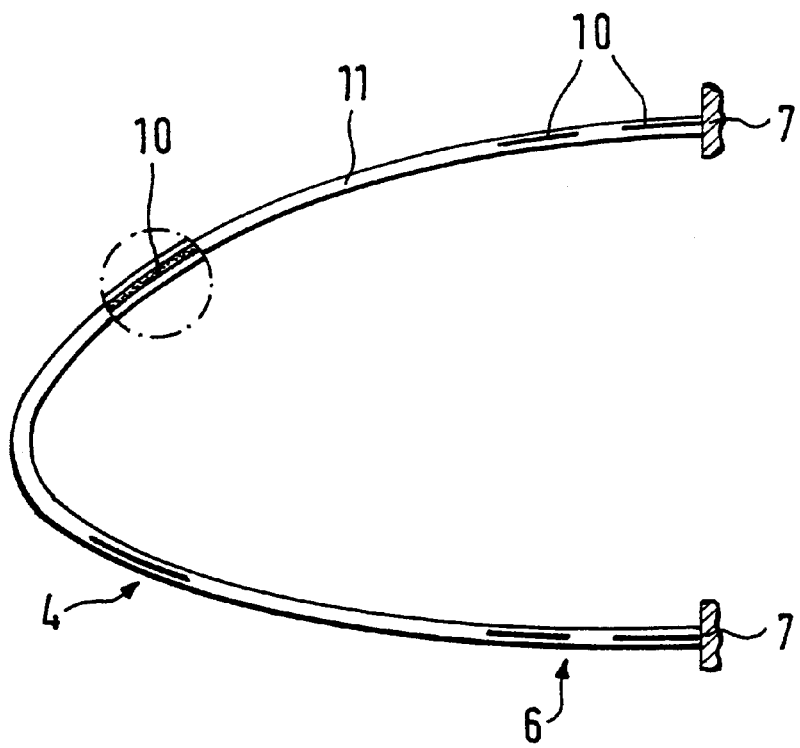

FIG. 3 shows a second embodiment of a leading edge 1 according to the invention. The multifunctional material is integrated as a shear-active layer 10 within the structure 11 of the leading edge 1. In contrast with the embodiment according to FIGS. 1 and 2 this has the advantage that, while the shear-active layer is certainly provided in partly distributed manner over the leading edge 1, just as in the embodiment according to FIG. 1 or 2, as a result of the integration within the structure 11 of the profile it is ensured that removal of the shear-active layer from the leading edge 1 is not possible without total destruction of the leading edge. The shear-active layer 10 is accordingly protected within the structure of the leading edge 1. Moreover it also proves to be advantageous that the drive is effected directly from within the structure and is not undertaken from the outside and/or inside of the profile.

Figure 4:
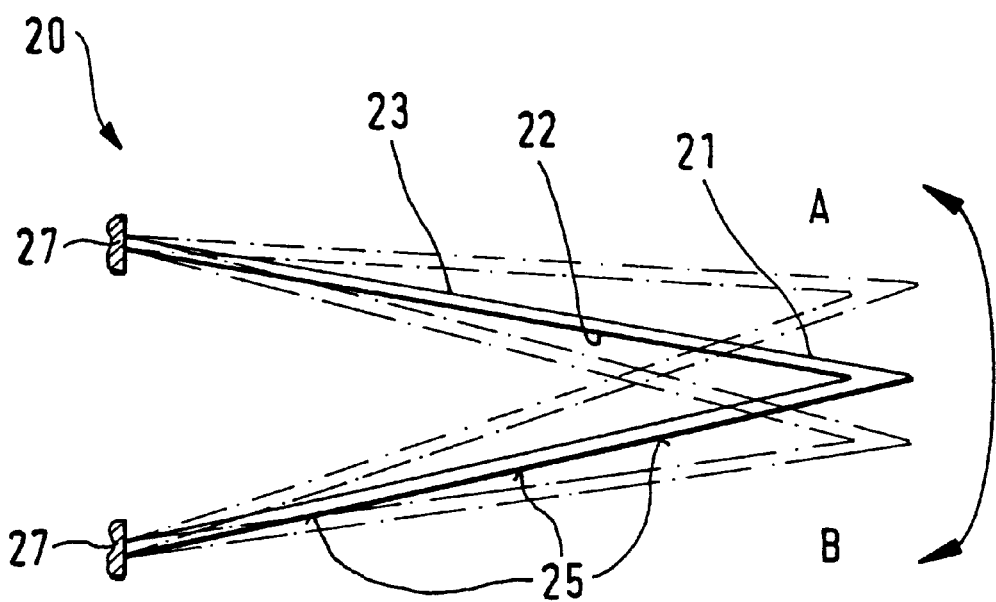

In FIG. 4 a third embodiment of a profile edge according to the invention is represented in the form of an elastic trailing edge 20. Instead of the drive of the leading edge according to FIGS. 1 to 3 for the purpose of creating a selective decrease or increase in the curvature—proceeding cyclically with the rotation of the rotor—of the profile with a view to improving the aerodynamic characteristics of a rotor blade, for example, in order above all to be able by this means to influence the effects of non-stationary separation of the flow (dynamic stall) positively, as a result of the provision of the elastic trailing edge 20 an appropriate transformation in terms of structural dynamics takes place, merely accompanied by different flow conditions. A variable curvature is generated, the discharge-flow conditions are changed.

Instead of the leading edge 1 tapering in the form of a parabola according to FIGS. 1 to 3, in FIG. 4 a structure 21 tapering to a point is provided. On the inside 22 and on the outside 23 of this structure 21 tapering to a point, layers 25 of multifunctional material are added in distributed manner.

The structure 21, which tapers to a point and is firmly supported at its rear point, of the elastic trailing edge 20 is mobile in its front pointed region. The possible directions of motion are indicated by the double-headed arrow in FIG. 4. The drive is effected in a manner corresponding to the drive of the leading edge 1 described with reference to the previous Figures. An in phase or antiphase drive of the actuators in the form of the layers 25 of multifunctional material may likewise be effected.

As an alternative to the embodiment represented, a slotted, elastic trailing edge which is open at its rear point may also be provided.

As a result of driving the actuators and the deformation following therefrom, a variable curvature of profiles can be generated.

The possible uses of the adaptive leading and trailing edges that have been described are numerous. For example, such adaptively regulated profile edges, namely profile edges that adapt themselves by appropriate adjustment of an angle of attack, can be used in helicopter rotor blades. But they are also particularly suitable for wind-power installations, turbine or compressor blades or for use on aerofoils of aircraft, particularly of fighter aircraft. Fields of application arise wherever the effects of non-stationary separation of flow are to be influenced positively by means of a selective decrease or increase in the curvature—proceeding cyclically with the rotation of the rotor—of the profile with a view to improving the aerodynamic characteristics of the rotor blade.

What is claimed is:

1. An adaptive profile edge of an aerodynamic profile, the aerodynamic profile having a body structure including an outside surface disposed along a periphery of the profile edge, an inside surface opposite the outside surface, an upper side and an under side, the profile edge comprising:
   an initial curvature;
   a coating of multifunctional material disposed in a partly distributed manner on the outside surface of the profile edge;
   and wherein upon introduction of an external force to the profile edge the multifunctional material is activated, activation of the multifunctional material causing a structural deformation of the profile edge along its length thereof so as to vary the initial curvature of the first profile edge into a second curvature.

2. Profile edge according to claim 1, wherein activation of the multifunctional material can be effected selectively and variably over a length of the profile edge.

3. Profile edge according to claim 2, wherein the multifunctional material can be driven in phase or out of phase.

4. Profile edge according to claim 1, wherein the distance between the outside surface and inside surface defines a wall thickness which is variable over a length of the profile edge.

5. Profile edge according to claim 1, further comprising a sensor consisting of multifunctional material and an adaptive regulator operatively associated therewith, wherein the sensor detects actual deformation of the profile edge and the adaptive regulator compares the actual deformation with a predetermined desired value.

6. Profile edge according to claim 1, wherein the profile edge is a leading edge of the aerodynamic profile.

7. Profile edge according to claim 1, wherein the multifunctional material comprises a material suitable for high-frequency applications.

8. Profile edge according to claim 1, wherein the profile edge comprises a fibre composite material.

9. Profile edge according to claim 8, wherein the coating of multifunctional material is laminated or bonded onto the profile edge.

10. Profile edge according to claim 1, wherein the profile edge is a trailing edge of the aerodynamic profile.

11. Profile edge according to claim 10, further comprising a leading edge tapering to a point such that a variable curvature of profiles can be generated.

12. Profile edge according to claim 1, wherein the profile edge is part of a helicopter rotor blade, part of a vane of a wind-power installation, part of a turbine blade, part of a compressor blade or part of an aerofoil of an aircraft.

13. Profile edge according to claim 1, wherein the external force is a flexural moment, a longitudinal force, or a thrust force.

14. Profile edge according to claim 1, wherein the multifunctional material is provided in a partly distributed manner on the inside surface of the profile edge.

15. Profile edge according to claim 14, wherein the multifunctional material is provided in a partly distributed manner on the upper side of the profile edge.

16. Profile edge according to claim 14, wherein the multifunctional material is provided in a partly distributed manner on the under side of the profile edge.

17. Profile edge according to claim 5, further comprising an actuator operatively associated with the adaptive regulator and multifunctional material, wherein a deviation of the actual deformation of the profile edge from the desired value is regulated by a response of the actuator to the multifunctional material.

18. Profile edge according to claim 17, wherein the sensor consisting of multifunctional material also serves as the actuator.

19. Profile edge according to claim 7, wherein the material suitable for high frequency applications is selected from the group consisting of piezoceramic, electrostrictive or magnetostrictive material.

20. Profile edge according to claim 8, wherein the fibre composite material is selected from the group consisting of carbon-reinforced composite material, graphite-reinforced composite material, or metal.

21. Profile edge according to claim 8, wherein the coating of multifunctional material is applied by means of a plasma process or is incorporated into the outer layers of the profile edge by lamination.

22. Profile edge according to claim 1, wherein the profile edge is a leading edge of the aerodynamic profile.

23. An adaptive profile edge of an aerodynamic profile, the aerodynamic profile having a body structure including an outside surface disposed along a periphery of the profile edge, an inside surface opposite the outside surface, an upper side and an under side, the profile edge comprising:

an initial curvature;

a coating of multifunctional material disposed in a partly distributed manner on the inside surface of the profile edge;

and wherein upon introduction of an external force to the profile edge the multifunctional material is activated, activation of the multifunctional material causing a structural deformation of the profile edge along its length thereof so as to vary the initial curvature of the first profile edge into a second curvature.

24. An adaptive profile edge of an aerodynamic profile, the aerodynamic profile having a body structure including an outside surface disposed along a periphery of the profile edge, an inside surface opposite the outside surface, an upper side and an under side, the profile edge comprising:

an initial curvature;

a shear-active layer of multifunctional material disposed within the body structure of the aerodynamic profile in a partly distributed manner;

and wherein upon introduction of an external force to the profile edge the multifunctional material is activated, activation of the multifunctional material causing a structural deformation of the profile edge along its length thereof so as to vary the initial curvature of the first profile edge into a second curvature.

25. Profile edge according to claim 24, wherein the shear active layer is enclosed within the body structure of the aerodynamic profile.

26. Profile edge according to claim 24, wherein activation of the multifunctional material can be effected selectively and variably over a length of the profile edge.

27. Profile edge according to claim 24, wherein the multifunctional material can be driven in phase or out of phase.

28. Profile edge according to claim 24, wherein the profile edge is a leading edge.

29. Profile edge according to claim 24, wherein the profile edge is a trailing edge.

30. An aerodynamic profile, comprising:

a leading edge having an initial curvature;

a trailing edge having an initial curvature;

a body structure extending between the leading edge and the trailing edge, and including an outside surface disposed along a periphery of the leading and trailing edges, an inside surface opposite the outside surface, an upper side and an under side;

a coating of multifunctional material disposed in a partly distributed manner on the outside surface of one of the leading edge and trailing edge; and wherein upon introduction of an external force to the multifunctional material, the material is activated, activation of the multifunctional material causing a structural deformation of the one of the leading and trailing edges at which the material is disposed so as to vary the initial curvature of the edge along its length into a second curvature.

31. The aerodynamic profile of claim 30, wherein the second curvature is increased from the initial curvature.

32. The aerodynamic profile of claim 30, wherein the second curvature is decreased from the initial curvature.

33. The aerodynamic profile of claim 30, wherein the coating of multifunctional material is disposed in a partly distributed manner on the outside surface of both of the leading edge and trailing edge.

* * * * *